GRAY & PORTER.
Attaching Vehicle Axles.

No 77,185. Patented April 28, 1868.

Witnesses

Timothy B Bifrill
Zalmon L Jacobs

Inventor

William Gray
Henry E. Porter

United States Patent Office.

WILLIAM GRAY AND HENRY E. PORTER, OF HEBRON, CONNECTICUT.

Letters Patent No. 77,185, dated April 28, 1868.

IMPROVED MODE OF ATTACHING AXLES TO VEHICLES.

*The Schedule referred to in these Letters Patent and making part of the same.*

TO ALL WHOM IT MAY CONCERN:

Be it known that we, WILLIAM GRAY and HENRY E. PORTER, of Hebron, in the county of Tolland, in the State of Connecticut, have invented a new, useful, and improved Mode of Attaching the Forward Axle to Vehicles; and we do hereby declare that the following is a full, clear, and exact description thereof, reference being had to the accompanying drawings, making a part of this specification, in which—

Figure 1:
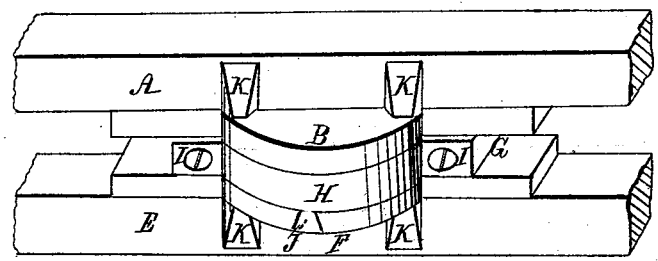

Figure 1 is a perspective view, and

Figure 2:
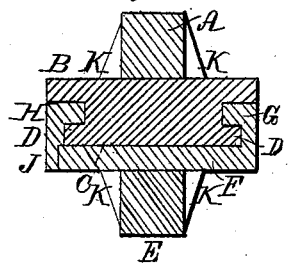

Figure 2 a transverse section.

Similar letters of reference indicate like parts in both figures.

The nature of our invention consists in a peculiar construction and arrangement of appendages to the face-plates of the bolster and forward axle of four-wheeled vehicles, whereby the usual circles or fifth-wheel and the central or king-bolt are dispensed with, and the parts more securely and economically held in their places.

To enable others skilled in the art to which our invention appertains to make and use the same, we will describe its construction and use.

To the under side of the bolster or rocker A is secured, in any proper manner, the plate B, which has upon its under side a cylindrical projection or pivot, C, with a flange, D. To the upper side of the axle E is attached the plate F, which has upon its upper side a semicircular rim, G, cast in one piece with the said plate F, and formed to fit loosely around one side of the body and flange of the aforesaid pivot C. A semicircular cap, H, similar in form to the above-described rim G, fits the side of pivot C, opposite to the said rim, and is firmly held in its place by means of the screws I and the dove-tail-shaped projection J, which arrangement admits of the flanged pivot C being entered and secured firmly in the socket or recess formed by and between the rim G and cap H. Wedge-shaped projections, K, four on each plate, embrace the parts to which said plates are attached, and materially aid in keeping them in their places. Such is the construction of our device.

It will readily be seen that the pivot C being cylindrical, is free to revolve to any desired extent within the socket formed by the rim G and cap H, and that its flange D being entire, and held down on all sides, the attachment of the axle to the bolster is equally firm in all the positions in which it may be placed, which features are prominent objects of our device.

Having thus fully described our invention, we claim—

1. As an improved mode of manufacture, a device for securing together the forward axle and rocker of a vehicle.

2. The combination of the plate B, having a round flange, D, plate F, with a corresponding round-flange recess and plate G F, which encloses and allows the flange D to work closely and freely therein, by means of the segmental portion H of said plate, and the projections K, for griping the rocker A and axle E, substantially as and for the purpose described.

WILLIAM GRAY,
HENRY E. PORTER.

Witnesses:
TIMOTHY P. BISSELL,
ZALMON L. JACOBS.